(12) United States Patent  
Hashimoto et al.

(10) Patent No.: US 9,021,979 B2  
(45) Date of Patent: May 5, 2015

(54) AUTOMOBILE INSTRUMENT

(75) Inventors: Riyuuichi Hashimoto, Shizuoka-ken (JP); Masanobu Terao, Shizuoka-ken (JP); Takayuki Ogawa, Shizuoka-ken (JP)

(73) Assignee: Yazaki Corporation, Tokyo (JP)

(*) Notice: Subject to any disclaimer, the term of this patent is extended or adjusted under 35 U.S.C. 154(b) by 285 days.

(21) Appl. No.: 13/702,404

(22) PCT Filed: Oct. 21, 2011

(86) PCT No.: PCT/JP2011/074329  
§ 371 (c)(1),  
(2), (4) Date: Dec. 6, 2012

(87) PCT Pub. No.: WO2012/057035  
PCT Pub. Date: May 3, 2012

(65) Prior Publication Data  
US 2013/0087092 A1    Apr. 11, 2013

(30) Foreign Application Priority Data  
Oct. 26, 2010    (JP) .................. 2010-239840

(51) Int. Cl.  
 G01D 13/02    (2006.01)  
 G01D 11/28    (2006.01)  
 B60K 37/02    (2006.01)

(52) U.S. Cl.  
 CPC ............. G01D 13/02 (2013.01); G01D 11/28 (2013.01); B60K 37/02 (2013.01); Y10S 116/36 (2013.01)

(58) Field of Classification Search  
 CPC ....... G01D 11/28; G01D 13/02; G01D 13/04; B60K 35/00; B60K 37/02

USPC ........ 116/286, 287, 288, DIG. 36; 362/23.12, 362/23.13, 23.14, 23.16, 23.17, 23.19, 23.2, 362/23.21, 489  
See application file for complete search history.

(56) References Cited

U.S. PATENT DOCUMENTS

| 8,016,442 B2 * | 9/2011 | Kato ............................. 362/30 |
| 2008/0219018 A1 * | 9/2008 | Eich ............................. 362/489 |
| 2009/0219730 A1 * | 9/2009 | Syfert et al. .................. 362/489 |

FOREIGN PATENT DOCUMENTS

| JP | 09-287980 | 11/1997 | |
| JP | 2002-071392 | 3/2002 | |
| JP | 2002296078 A * | 10/2002 | ............ G01D 11/24 |
| JP | 2006-242639 | 9/2006 | |

(Continued)

OTHER PUBLICATIONS

Office Action issued Jul. 22, 2014 in counterpart Chinese Application No. 2011-80023593.8.

(Continued)

Primary Examiner — R. A. Smith  
(74) Attorney, Agent, or Firm — Sughrue Mion, PLLC

(57) ABSTRACT

An automobile instrument (1) includes: a dial (4); an indicator (11) configured to rotate on the dial (4); a facing member (14) configured to surround a circumference of the dial (4) and comprising a plurality of transparent light guide portions (35) radially arranged respectively from an end of the circumference of the dial (4) at intervals in a circumferential direction of the dial (4); a first light source (17) configured to irradiate the dial (4) with light; and a second light source (19) configured to emit light to the transparent light guide portions (35).

7 Claims, 5 Drawing Sheets

(56) References Cited

FOREIGN PATENT DOCUMENTS

| | | | | |
|---|---|---|---|---|
| JP | 2007-51938 | | 3/2007 | |
| JP | 2007-85983 | | 4/2007 | |
| JP | 2007-85984 | | 4/2007 | |
| JP | 2007139609 A * | 6/2007 | ............ G01D 11/28 |
| JP | 2008-116303 | | 5/2008 | |
| JP | 2008128997 A * | 6/2008 | ............ G01D 11/28 |
| JP | 2008-203061 | | 9/2008 | |
| JP | 2009-058357 | | 3/2009 | |
| JP | 2009-198465 | | 9/2009 | |
| JP | 2009-264925 | | 11/2009 | |
| JP | 2010-054358 A | | 3/2010 | |
| JP | 2010127813 A * | 6/2010 | ............ G01D 11/28 |
| JP | 2010-151789 | | 7/2010 | |
| JP | 2011085554 A * | 4/2011 | ............ G01D 11/28 |
| WO | WO 2009034052 A1 * | 3/2009 | ............ B60K 35/00 |

OTHER PUBLICATIONS

Office Action issued on Nov. 26, 2013 in counterpart Japanese application No. 2010-239840.

* cited by examiner

AUTOMOBILE INSTRUMENT

CROSS REFERENCE TO RELATED APPLICATIONS

This application is a national phase application based on PCT/JP2011/074329, filed Oct. 21, 2011, which claims the priority of Japanese Patent Application No. 2010-239840, filed Oct. 26, 2010, the contents of all of which are incorporated herein by reference.

TECHNICAL FIELD

The present invention relates to an automobile instrument such as a speedometer and an engine tachometer.

BACKGROUND ART

With respect to automobile instruments, devising has been performed to improve design performance. FIG. 1 illustrates a related automobile instrument 100 disclosed in Patent Literature 1.

In the automobile instrument 100 illustrated in FIG. 1, a case 112 is attached onto the wiring board 111 and a dial 120 is attached onto the case 112. A ring member 130 which surrounds the dial is arranged at the circumference of the dial 120. A facing member 140 is arranged at the circumference of the ring member 130 as rising to surround the ring member 130 and the dial 120. The dial 120 and the ring member 130 are formed of translucent resin while the facing member 140 is formed of black resin. A ring-shaped light guide 145 is arranged at a lower part of the facing member 140. The light guide 145 is illuminated at the lower side of the facing member 140.

Characters 121 are formed at the dial 120 by printing and the like. Scale marks 131 corresponding to the characters 121 are formed at the ring member 130 to be at regular intervals on the circumference thereof. An inner device 155 is attached to the back side of the wiring board 111. An indicator 150 is joined to the inner device 155. The indicator 150 is arranged at a center section of the dial 120 and indicates driving speed of an automobile as being rotated on the dial 120 by the driving of the inner device 155.

In the automobile instrument 100, light sources are mounted on the wiring board 111. A light source 160 for the dial irradiating the dial 120 with light is arranged at the lower side of the dial 120. A light source 161 for the ring member irradiating the ring member 130 with light is arranged at the lower side of the ring member 130. A light source 162 for the light guide irradiating the light guide with light is arranged at the lower side of the light guide 145. The light sources 160, 161, 162 are formed of a plurality of light-emitting diodes (LEDs).

The dial 120, the ring member 130 and the light guide 145 are to be in an illuminated state as being irradiated with light owing to emitting of the respective light sources 160, 161, 162. Accordingly, it is possible to illuminate the characters 121 of the dial 120, the scale marks 131 of the ring member, and the lower side of the facing member 140.

CITATION LIST

Patent Literature

Patent Literature 1: Japanese Patent Application Laid-Open No. 2007-85984

SUMMARY OF INVENTION

In the related automobile instrument 100 described above, visibility can be improved by illuminating the dial 120 and the ring member 130. However, since the dial 120 and the ring member 130 are simply illuminated, decorative performance is insufficient.

It is an object of the present invention to provide an automobile instrument having excellent decorative performance.

An aspect of the present invention is an automobile instrument including: a dial; an indicator configured to rotate on the dial; a facing member configured to surround a circumference of the dial and including a plurality of transparent light guide portions radially arranged respectively from an end of the circumference of the dial at intervals in a circumferential direction of the dial; a first light source configured to irradiate the dial with light; and a second light source configured to emit light to the transparent light guide portions.

According to the abovementioned aspect, the dial is illuminated by light from the first light source. Light from the second light source illuminates the transparent light guide portions which are formed at the facing member as arriving at the transparent light guide portions. Since the facing member surrounds the circumference of the dial, the transparent light guide portions produce an effect to further illuminate the circumference of the illuminated dial. Accordingly, it is possible to provide decorative performance causing attention for visibility to be paid to the dial.

The dial may include a flat plate portion extended toward a circumferential side from a center section of the automobile instrument and having characters formed on an outer periphery thereof, and a slant portion downwardly slanted at the circumferential side of the flat plate portion.

According to the above structure, since the slant portion which is downwardly slanted at the circumferential side of the flat plate portion where the characters are formed, characters are visible as if being floated. Thus, it is possible to improve decorative performance of the dial.

The transparent light guide portions may be arranged as corresponding to characters formed at the flat plate portion.

According to the above structure, since the transparent light guide portions are formed as corresponding to the characters of the dial, the visibility of the characters can be improved as attention being paid to the characters.

The dial may be arranged at a center section of the automobile instrument.

The automobile instrument may further include an inner device configured to drive rotation of the indicator.

DESCRIPTION OF EMBODIMENTS

Figure 1:
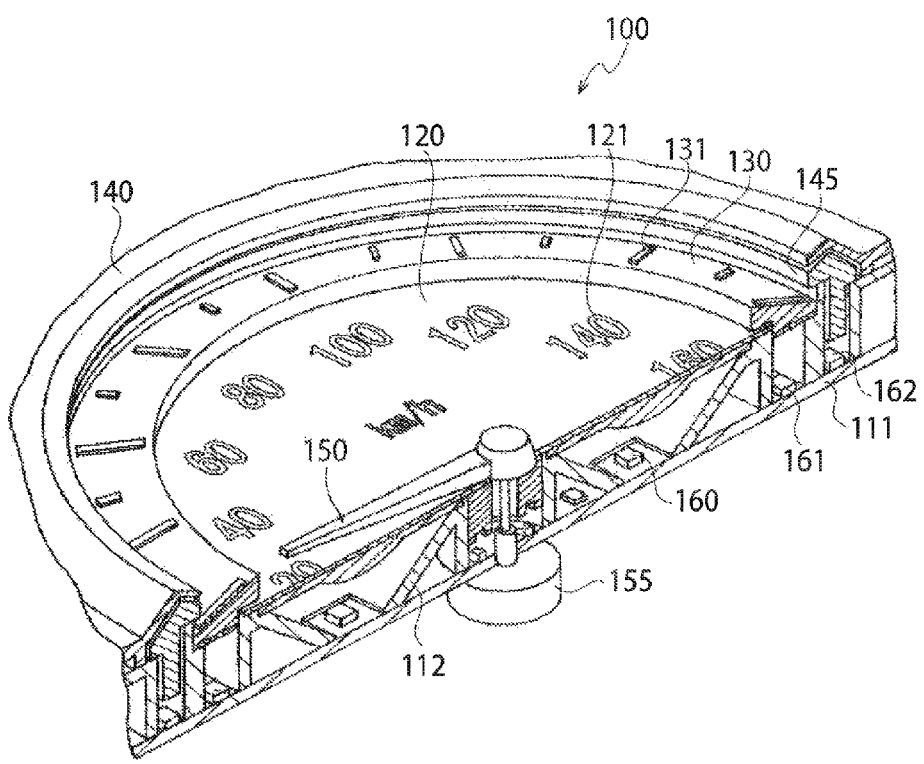
FIG. 1 is a perspective view of a related automobile instrument.
Figure 2:
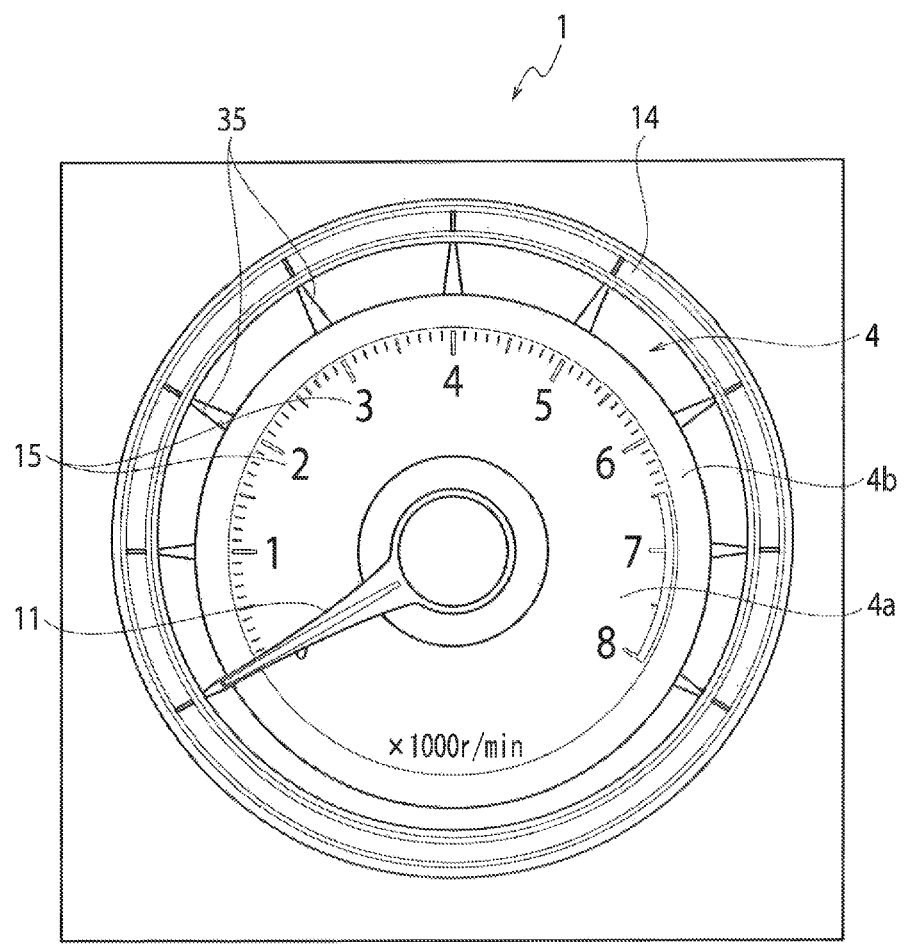
FIG. 2 is a front view illustrating an automobile instrument according to an embodiment of the present invention.

In the following, an embodiment illustrating the present invention will be specifically described. FIG. 2 is a front view of an automobile instrument 1 according to the embodiment of the present invention, FIG. 3 is a sectional view thereof, FIG. 4 is a perspective view having a part thereof removed, and FIG. 5 is an overall perspective view.

In the present embodiment, the automobile instrument 1 is applied for an engine tachometer. In the automobile instrument 1, a case 3 is attached onto a wiring board 2. A dial 4 and a facing member 14 are attached to the case 3. The wiring board 2 is formed of a hard-type substrate.

Figure 3:
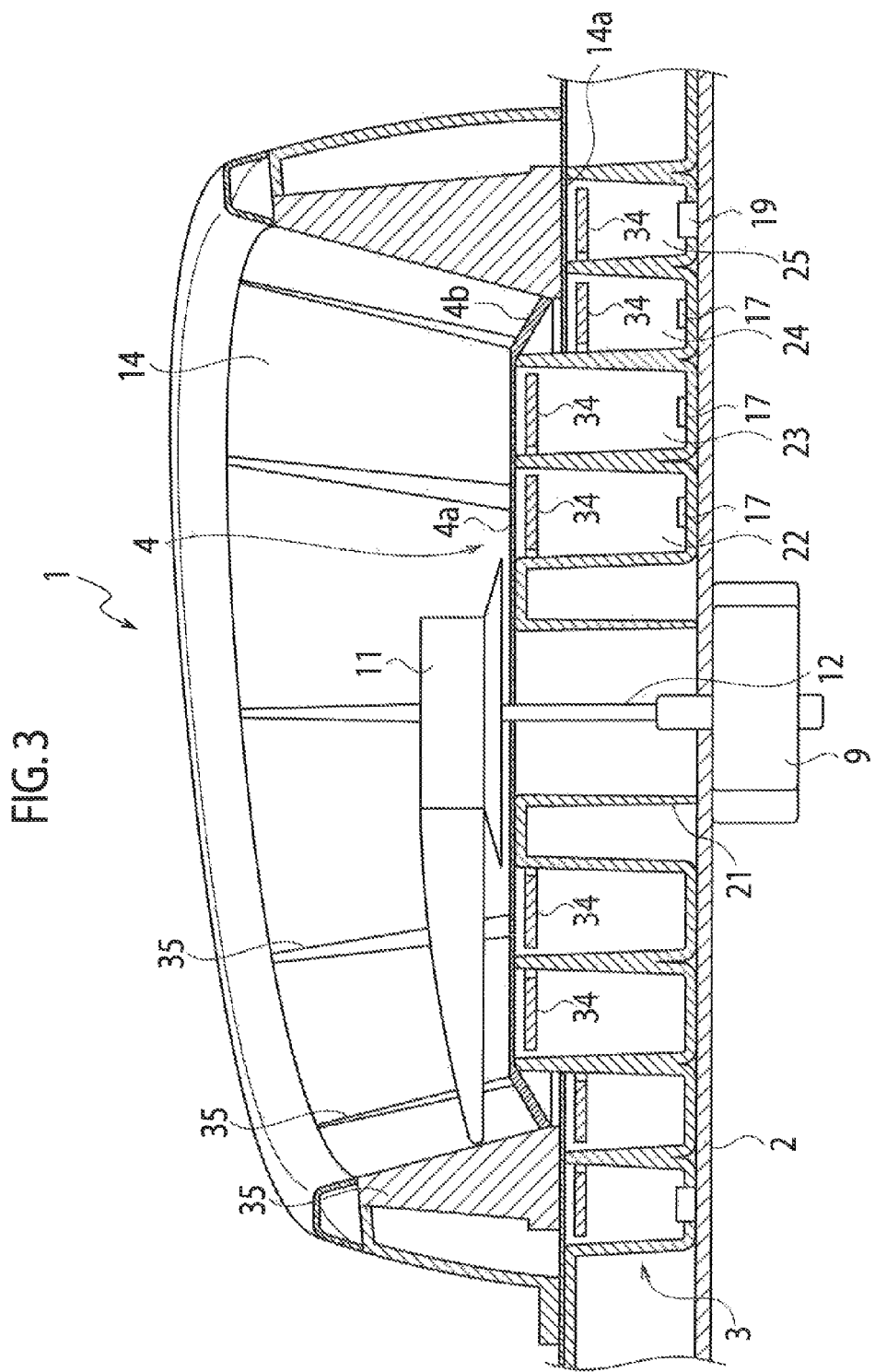
FIG. 3 is a sectional view of the automobile instrument according to the embodiment of the present invention.
Figure 4:
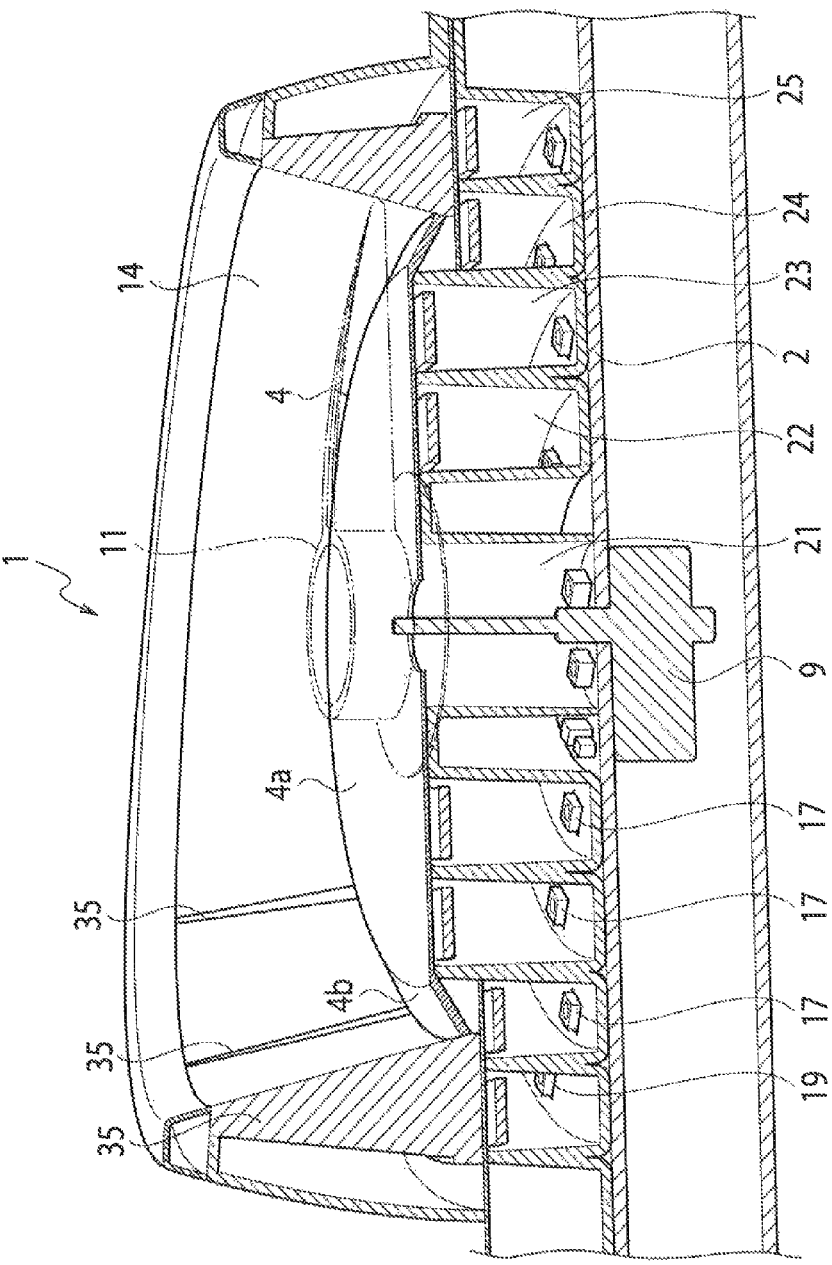
FIG. 4 is a perspective view of the automobile instrument according to the embodiment of the present invention having a part thereof removed.
Figure 5:
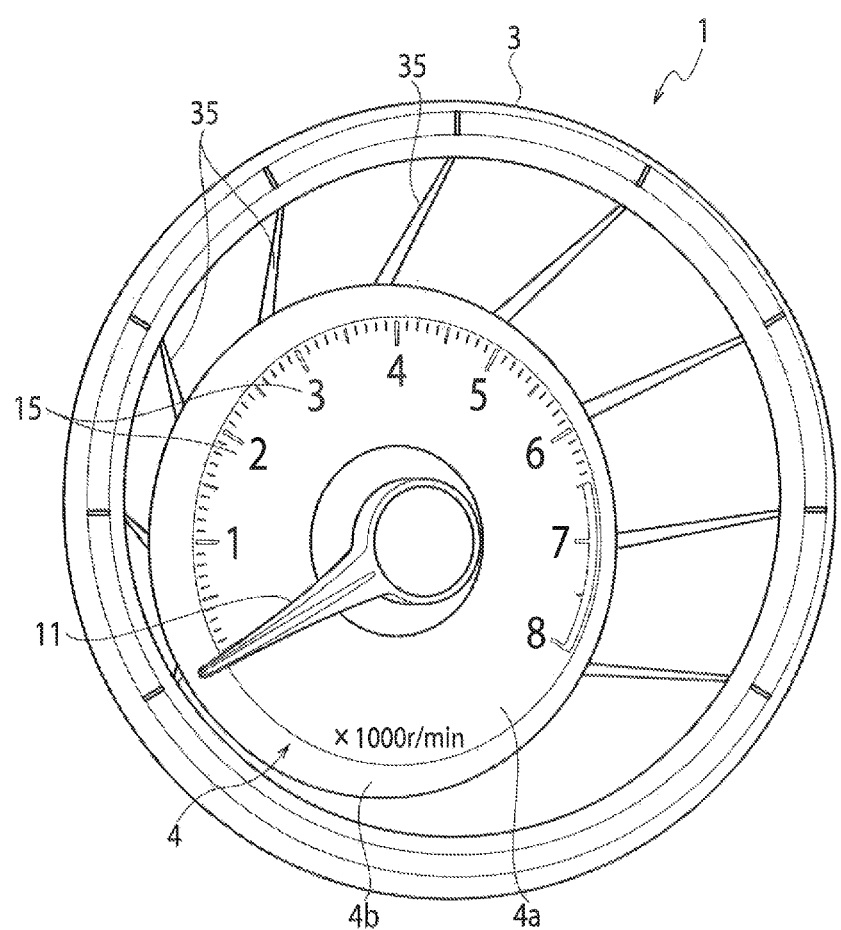
FIG. 5 is an overall perspective view of the automobile instrument according to the embodiment of the present invention.

As illustrated in FIGS. 3 and 4, an inner device 9 is attached to a lower face of the wiring board 2. The inner device 9 includes a rotary shaft 12 projecting to penetrate the wiring board 2 and an indicator 11 is attached to the rotary shaft 12. The rotary shaft 12 is rotated by the inner device 9. Then, the indictor 11 is rotated in accordance with the rotation of the rotary shaft 12. The indicator 11 is rotated about a center section of the later-mentioned dial 4 to indicate engine revolution speed owing to the rotation.

The case 3 is formed of light-blocking resin and is fixed onto the wiring board 2. The case 3 includes a vertical circumferential wall 21 which surrounds the center section (rotary shaft) of the instrument 1, a first accommodation recess 22, a second accommodation recess 23, a third accommodation recess 24, and a fourth accommodation recess 25 which are formed as being outwardly adjacent from the vertical circumferential wall 21. The accommodation recesses 22, 23, 24, 25 are formed respectively into a ring-shape in a plane view having a U-shaped concave cross-section with an upper face thereof opened and is supported as a lower face thereof being abutted to the wiring board 2. The first accommodation recess 22 and the second accommodation recess 23 are formed to be higher than the third accommodation recess 24 and the fourth accommodation recess 25.

The dial 4 is disc-shaped and is arranged on the case 3. The dial 4 is fixed onto the case 3 in a state of covering the vertical circumferential wall 21, the first accommodation recess 22, the second accommodation recess 23, and the third accommodation recess 24. That is, the dial 4 is sized with a diameter being equal to that obtained by joining the vertical circumferential wall 21, the first accommodation recess 22, the second accommodation recess 23, and the third accommodation recess 24. The dial 4 does not cover the fourth accommodation recess 25 which is located at the outermost side.

The dial 4 integrally includes a flat plate portion 4a which is circularly extended toward the circumferential side from the center section of the instrument 1 and a slant portion 4b which is arranged continuously to a circumferential side of the flat plate portion 4a. The flat plate portion 4a covers the vertical circumferential wall 21, the first accommodation recess 22, and the second accommodation recess 23. The slant portion 4b is slanted downwardly from the circumferential side of the flat plate portion 4a and covers the third accommodation recess 24 in the slanted state.

The dial 4 is formed of translucent resin such as acrylic resin. As illustrated in FIG. 2, characters 15 such as "0", "1" and "2" are formed at the circumferential side of the flat plate portion 4a of the dial 4 by printing, stamping or the like. The characters 15 are formed at the circumferential side of the flat plate portion 4a at regular intervals. The indicator 11 is rotated in a range where the characters 15 are formed. In the present embodiment, the indicator 11 is formed long beyond the flat plate portion 4a of the dial 4, so that the top end section is extended to the outer side of the flat plate portion. 4a.

A first, source 17 which irradiates the dial 4 with light is arranged respectively at the first accommodation recess 22, the second accommodation recess 23, and the third accommodation recess 24 of the case 3. The first light source 17 is formed with a plurality of LEDs mounted on the upper face of the wiring board 2 to be accommodated in the accommodated recesses 22, 23, 24. Owing to respective emission of the LEDs structuring the first light source 17, the emitted light appears at the dial 4 from the back side.

In this case, since the first light source 17 arranged at the inside of the first accommodation recess 22 and the second accommodation recess 23 irradiates the flat plate portion 4a of the dial 4, the flat plate portion 4a is illuminated and visibility of the characters 15 of the flat plate portion 4a can be brightly obtained. Meanwhile, since the first light source 17 arranged at the inside of the third accommodation recess 24 irradiates the slant portion 4b of the dial 4, the slant portion 4b is illuminated. Since the slant portion 4b is downwardly slanted along with the above, the facing member 14 arranged at the circumference of the dial 4 is irradiated with light which arrives at the facing member 14 after arriving at the slant portion 4b and permeating through the slant portion 4b.

The facing member 14 has a three-dimensional ring shape being planarly circular rising from the case 3 to surround the dial 4 at the circumference of the dial 4. The facing member 14 is formed of translucent resin such as acrylic resin and predetermined coloring such as blue coloring is performed on an inner surface thereof. The facing member 14 has a quadrangular pyramid shape of which thickness becomes thin toward the upper side as the lower part being thick. The facing member 14 covers the fourth recess 25 of the case 3 with the thick bottom face section thereof. Since coloring is performed on a bottom face 14a of the facing member 14, light can enter into the facing member 14 through the bottom face 14a.

A second light source 19 is arranged inside the fourth accommodation recess 25. The second light source 19 is formed of a plurality of LEDs mounted on the upper face of the wiring board 2 to be accommodated in the fourth accommodation recess 25. Owing to respective emission of the LEDs, the emitted light appears at the facing member 14. Accordingly, the facing member 14 is illuminated and light enters into the facing member 14 through the bottom face 14a.

In the present embodiment, a diffuser plate 34 is arranged respectively inside the first to fourth accommodation recesses 22, 23, 24, 25. The diffuser plates 34 are fixed as being fitted at upper parts of the accommodation recesses 22, 23, 24, 25. Owing to arranging the diffuser plates 34 as described above, light from the first light source 17 and the second light source 19 is diffused and the diffused light illuminates the dial 4 and the facing member 14.

A plurality of transparent light guide portions 35 is formed at the facing member 14. The transparent light guide portions 35 are formed by exposing a surface of the facing member 14 without coloring to be transparent enabling light to permeate therethrough.

The transparent light guide portions 35 are formed as rising along a height direction of the facing member 14 respectively from an end of the circumference of the slant portion 4b of the dial 4. The plurality of transparent light guide portions 35 are formed radially at the facing member 14 at intervals in the circumferential direction. In the present embodiment, each transparent light guide portion 35 is formed into a slim triangular shape of which width becomes narrow toward the upper side as the lower side being wide.

Since the transparent light guide portions 35 are formed as being capable of having light permeate therethrough, light from the second light source 19 entered into the facing member 14 from the bottom face 14a illuminates the transparent light guide portions 35. Accordingly, it is possible to form triangular illuminated sections of the transparent light guide portions 35 at the facing member 14.

As illustrated in FIG. 2, the transparent light guide portions 35 which are radially arranged correspond respectively to the characters 15 which are formed at the flat plate portion 4a of the dial 4. That is, the transparent light guide portions 35 are formed at positions respectively corresponding to the outer side of the characters 15 of the dial 4. The indicator 11 is formed so that the top end section being extended to the outer side from the dial 4 is extended to arrive at the transparent light guide portions 35 and the indicator 11 points to each transparent light guide portion 35.

In the automobile instrument 1 of the above embodiment, the dial 4 is illuminated with light from the first light source 17 and the transparent light guide portions 35 of the facing member 14 are illuminated with light from the second light source 19. As being illuminated at the circumference of the dial 4, the transparent light guide portions 35 produce an effect to further illuminate the circumference of the illuminated dial 4. Accordingly, it is possible to provide decorative performance causing attention for visibility to be paid to the dial 4.

With respect to the dial 4, since the slant portion 4b which is downwardly slanted is formed at the circumferential side of the flat plate portion 4b where the characters 15 are formed, decorative performance of the dial 4 can be improved as the characters 15 becoming visible as if being floated.

Since the transparent light guide portions 35 are formed as corresponding to the characters 15 of the dial 4, the visibility of the characters 15 can be improved as attention being paid to the characters 15.

In the above embodiment, owing to that lighting control is performed against the light sources 17, 19 arranged at the plurality of accommodation recesses 22, 23, 24, 25, it is possible to perform lighting control such as ON-OFF illuminating of the dial 4 and the transparent light guide portions 35, and time-shifted lighting of illumination. Accordingly, decorative performance can be further improved.

With respect to the plurality of transparent light guide portions 35, it is possible to perform indication for each of the transparent light guide portions 35 with light differently in color. For example, when specific transparent light guide portions 35 are illuminated with light of which color is different from that of the other transparent light guide portions 35 (for example, red color light against white color light), a range of a red zone can be indicated and indication with scale-change can be performed. Thus, it is possible to improve decorative performance.

The present embodiment adopts an independent state in which the plurality of accommodation recesses 22, 23, 24, 25 are partitioned. However, it is also possible to irradiate accommodation recesses being a common illumination target by using a common light source without partitioning. With the above, structure thereof can be simplified and cost therefor can be reduced.

Although the embodiment of the present invention has been described above, the invention is not limited to the above embodiment, and various modifications are possible.

The invention claimed is:

1. An automobile instrument comprising:
   a dial;
   an indicator configured to rotate on the dial;
   a facing member surrounding a circumference of the dial and comprising a plurality of transparent light guide portions radially arranged respectively from an end of the circumference of the dial at intervals in a circumferential direction of the dial;
   a first light source configured to irradiate the dial with light; and
   a second light source configured to emit light to the transparent light guide portions,
   wherein the dial comprises:
      a flat plate portion extended toward a circumferential side from a center section of the automobile instrument and having characters formed on an outer periphery thereof, and
      a slant portion downwardly slanted at the circumferential side of the flat plate portion, and
   wherein the indicator has a top end section extending to arrive at the transparent light guide portions.

2. The automobile instrument according to claim 1, wherein the transparent light guide portions are arranged as corresponding to characters formed at the flat plate portion.

3. The automobile instrument according to claim 1, wherein the dial is arranged at a center section of the automobile instrument.

4. The automobile instrument according to claim 1, further comprising an inner device configured to drive rotation of the indicator.

5. The automobile instrument according to claim 1, wherein a width of each of the plurality of transparent light guide portions becomes narrower as each of plurality of transparent light guide portions extend away from the dial.

6. The automobile instrument according to claim 1, wherein a circumferential edge of the slant portion is an outermost edge of the dial.

7. The automobile instrument according to claim 1, wherein the plurality of transparent light guide portions extend directly from a circumferential edge of the slant portion.

* * * * *